US008363578B1

(12) United States Patent
Ramamurthy et al.

(10) Patent No.: US 8,363,578 B1
(45) Date of Patent: Jan. 29, 2013

(54) BANDWIDTH SELECTION METHOD AND APPARATUS

(75) Inventors: Harish Ramamurthy, Sunnyvale, CA (US); Sandesh Goel, Fremont, CA (US); Brian Bosso, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 1004 days.

(21) Appl. No.: 12/106,241

(22) Filed: Apr. 18, 2008

Related U.S. Application Data

(60) Provisional application No. 60/913,439, filed on Apr. 23, 2007.

(51) Int. Cl.
*H04B 7/00* (2006.01)
(52) U.S. Cl. .................................................. 370/310
(58) Field of Classification Search .............. 370/203, 370/204–215, 229–240, 241–253, 310–337, 370/338–350, 395.1, 395.3, 395.4, 395.41, 370/395.42, 395.5, 395.52, 395.53, 412–421, 370/521–529
See application file for complete search history.

(56) References Cited

U.S. PATENT DOCUMENTS

| | | | | |
|---|---|---|---|---|
| 7,577,450 | B2 * | 8/2009 | Miyazaki | 455/464 |
| 8,050,200 | B2 | 11/2011 | Goel et al. | |
| 2002/0060995 | A1 * | 5/2002 | Cervello et al. | 370/332 |
| 2002/0188723 | A1 * | 12/2002 | Choi et al. | 709/225 |
| 2004/0170136 | A1 * | 9/2004 | Woo et al. | 370/320 |
| 2006/0146869 | A1 * | 7/2006 | Zhang et al. | 370/465 |
| 2006/0159003 | A1 | 7/2006 | Nanda et al. | |
| 2006/0217125 | A1 * | 9/2006 | Miyazaki | 455/453 |
| 2007/0060155 | A1 | 3/2007 | Kahana et al. | |
| 2007/0149230 | A1 * | 6/2007 | Song et al. | 455/515 |
| 2007/0286122 | A1 * | 12/2007 | Fonseca | 370/329 |
| 2008/0112340 | A1 * | 5/2008 | Luebke | 370/310 |
| 2008/0146155 | A1 * | 6/2008 | Makhlouf et al. | 455/63.1 |
| 2008/0192644 | A1 | 8/2008 | Utsunomiya et al. | |
| 2009/0175237 | A1 * | 7/2009 | Husted et al. | 370/329 |
| 2011/0090939 | A1 * | 4/2011 | Diener et al. | 375/136 |

OTHER PUBLICATIONS

S. Mujtaba, IEEE 802.11 Wireless LANs, TGn Sync Proposal Technical Specification, May 2005.
"IEEE P802.11n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

\* cited by examiner

*Primary Examiner* — Kwang B Yao
*Assistant Examiner* — Jung-Jen Liu

(57) ABSTRACT

Selection between first and second communication channels of differing bandwidths for communication between communication devices may be chosen by a method, an apparatus, or a computer-readable medium wherein the first channel is employed as a communication channel, a determination is made whether a criterion associated with the communication channel is met, and, if the criterion associated with the communication channel is met, an evaluation of the second channel is performed and one of the first and second channels is chosen to subsequently employ as the communication channel based on the evaluation of the second channel.

29 Claims, 7 Drawing Sheets

| 802.11n versions later than 2.1.3.6 | 802.11n versions prior to 2.1.3.6 |
|---|---|
| MCS-15—4 0 MHz— SHORT_GI | MCS-15—4 0 MHz— SHORT_GI |
| MCS-15—4 0 MHz—LONG_GI | MCS-15—4 0 MHz—LONG_GI |
| MCS-14—4 0 MHz—LONG_GI | MCS-14—4 0 MHz—LONG_GI |
| MCS-13—4 0 MHz—LONG_GI | MCS-13—4 0 MHz—LONG_GI |
| MCS-12—4 0 MHz—LONG_GI | MCS-12—4 0 MHz—LONG_GI |
| MCS-11—4 0 MHz—LONG_GI | MCS-11—4 0 MHz—LONG_GI |
| MCS-12—2 0 MHz/4 0 MHz—LONG_GI | MCS-10—4 0 MHz—LONG_GI |
| MCS-12—2 0 MHz—LONG_GI | MCS-9—4 0 MHz—LONG_GI |
| MCS-11—2 0 MHz—LONG_GI | MCS-4—20/4 0 MHz—LONG_GI |
| MCS-10—2 0 MHz—LONG_GI | MCS-4—2 0 MHz—LONG_GI |
| MCS-9—2 0 MHz—LONG_GI | MCS-3—2 0 MHz—LONG_GI |
| MCS-2—2 0 MHz—LONG_GI | MCS-2—2 0 MHz—LONG_GI |
| MCS-1—2 0 MHz—LONG_GI | MCS-1—2 0 MHz—LONG_GI |
| Packets larger than 4K<br>MCS-0—2 0 MHz—LONG_GI | Packets larger than 4K<br>MCS-0—2 0 MHz—LONG_GI |
| Packet Length <= 4k<br>5.0 GHz: 12, 9, or 6 Mbps<br>2.4 GHz: 11, 5.5, 2, or 1 Mbps | Packet Length <= 4k<br>5.0 GHz: 12, 9, or 6 Mbps<br>2.4 GHz: 11, 5.5, 2, or 1 Mbps |

*FIG. 3*

| Field | Size (bytes) | Description | Value |
|---|---|---|---|
| Element ID | 1 | Element identifier | 221 |
| Length | 1 | Length of the payload | 6 |
| OUI | 3 | Unique Marvell identifier | 0x00:0x50:0x43 |
| Type | 1 | Marvell identification IE | 3 |
| Subtype | 1 | Sub type | 0 |
| Version | 1 | Version number | 0 |

*FIG. 4*

BANDWIDTH SELECTION METHOD AND APPARATUS

CROSS-REFERENCE TO RELATED APPLICATION

The present application claims the benefit of U.S. Provisional Application No. 60/913,439, entitled "11n BANDWIDTH SWITCHING," filed on Apr. 23, 2007, which is hereby incorporated by reference herein in its entirety.

FIELD OF TECHNOLOGY

The present disclosure relates generally to bandwidth-switching schemes and devices that use them, and more particularly, to techniques for switching between a first channel having a first bandwidth and a second channel having a second bandwidth different than the first bandwidth.

DESCRIPTION OF THE RELATED ART

Communication systems employing the IEEE 802.11 communication standards traditionally have employed 20 MHz bandwidth channels for wireless communication. More recently, the IEEE 802.11n working group introduced a concept called "channel bonding," which refers to the concurrent use of two adjacent 20 MHz channels or a total of 40 MHz of spectrum bandwidth for a single, "bonded" communication channel. By providing twice the bandwidth of conventional 20 MHz channels, these bonded channels effectively achieve data transmission rates that are double those of the original 20 MHz channels. However, the bonded channels also encounter twice the amount of average noise encountered by 20 MHz channels. Further, inasmuch as the entire wireless spectrum available for use with IEEE 802.11 technology is limited, channel bonding increases the likelihood of signal overlap with other co-located wireless transmitters. Thus, the availability of channel bonding in communication using the IEEE 802.11n standard (currently in draft form) provides a tradeoff between the high data throughput and correspondingly high noise level of a 40 MHz bonded channel on one hand and the lower data throughput and relatively lower noise level of a conventional 20 MHz channel on the other. The 802.11n working group offers channel bonding as an option for WiFi communication but leaves decisions regarding whether and how to implement channel bonding to device vendors.

Some prior systems employing the draft 802.11n communication standard have simply made an initial selection of which bandwidth (i.e., 20 MHz or 40 MHz) to use for communication and thereafter provided communication using that bandwidth. These systems sometimes have not produced satisfactory results, however, because communication channels encounter noise that varies with time, and a 40 MHz channel that may have been sufficiently quiet to use when the decision to do so was made may not remain sufficiently quiet throughout subsequent communication due to time-varying noise present in the communication channel.

Other systems simply attempt to select a bandwidth configuration that achieves highest data throughput, which also does not yield optimal results in some cases.

Where two stations operate in ad hoc mode, one of the stations can operate in 20 MHz mode while other station remains in 40 MHz mode. In that situation, the station in 20 MHz will be unable to receive transmissions in 40 MHz and will force the 40 MHz station to 20 MHz and both stations could thus get stuck in a 20 MHz mode of operation. The current IEEE 802.11n standard specifies control messages that must be exchanged to avoid such deadlock condition when implementing bandwidth switching, but the control messages introduce additional overhead which reduces data throughput.

SUMMARY OF THE DISCLOSURE

Some embodiments described herein seek to employ channel bonding to improve communication system performance by reducing receiver noise and mitigating channel interference. More particularly, these embodiments exemplify techniques for dynamically selecting between channels of different bandwidths, such as, for example, between a bonded 40 MHz channel and a conventional 20 MHz channel.

In one embodiment, a method of choosing between a first channel and a second channel for communication between wireless (e.g., WiFi) or other communication devices, wherein the first channel has a first bandwidth and the second channel has a second bandwidth different than the first bandwidth, comprises the steps of employing the first channel as a communication channel, determining whether a criterion associated with the communication channel is met, and, if so, performing an evaluation of the second channel and choosing one of the first and second channels to subsequently employ as the communication channel based on the evaluation of the second channel. By way of example, one of the first and second bandwidths may be twenty megahertz and the other may be forty megahertz.

The communication channel may have a clear channel assessment (CCA) threshold, and the determining step may comprise determining whether a CCA for the communication channel exceeds the CCA threshold.

The step of performing an evaluation of the second channel may comprise obtaining a CCA for the second channel, which may subsequently be employed as the communication channel if the CCA for the second channel is less than the CCA for the communication channel minus a preassigned amount DELTA. The first channel may subsequently be employed as the communication channel if the CCA for the second channel exceeds the CCA for the communication channel minus DELTA. The step of performing an evaluation of the second channel may be repeated if the CCA for the second channel is equal to the CCA for the communication channel minus DELTA.

The determining step may be performed by a communication device, and the CCA for the communication channel may exclude communication of the communication device.

The determining step may comprise determining whether a predetermined amount of time has elapsed since a prior change of the communication channel.

The step of performing an evaluation of the second channel may comprise developing a CCA for the second channel, which may subsequently be employed as the communication channel if the CCA for the second channel is less than the CCA for the communication channel plus a preassigned amount DELTA. The first channel may subsequently be employed as the communication channel if the CCA for the second channel exceeds the CCA for the communication channel plus DELTA. The evaluation of the second channel may be performed repeatedly if the CCA for the second channel is equal to the CCA for the communication channel plus DELTA.

A data rate may be employed for transmission of data in the communication channel that yields a packet error rate below a packet error rate threshold, and the employing step may include selecting a modulation scheme and a guard interval for use in the communication channel.

In another embodiment, a communication device adapted to communicate selectively via a first channel having a first bandwidth and a second channel having a second bandwidth different than the first bandwidth, includes a transmitter adapted to transmit data via a selected channel comprising one of the first and second channels, the other one of the first and second channels being a non-selected channel; a channel sensor for sensing the communication channel and providing an indication of whether a criterion associated with the communication channel is met; a channel evaluator adapted to perform an evaluation of the non-selected channel; and a channel selector adapted to choose one of the selected and non-selected channels to subsequently be employed as the selected channel based on the evaluation, if the criterion associated with the selected channel is met.

The channel sensor may provide an indication of whether a clear channel assessment (CCA) for the selected channel, or any other suitable measure of data traffic present on the selected channel, exceeds a predetermined threshold value.

The channel evaluator may be adapted to develop a CCA for the non-selected channel, which may subsequently be employed as the selected channel if the CCA for the non-selected channel is less than the CCA for the selected channel minus a predetermined amount DELTA. Also, the channel evaluator may be adapted to perform a further evaluation of the non-selected channel if the CCA for the non-selected channel is equal to the CCA for the selected channel minus DELTA.

The channel selector continues to choose the selected channel if the CCA for the non-selected channel exceeds the CCA for the selected channel minus DELTA. The channel selector also may be adapted to continue to employ the selected channel if the CCA for the non-selected channel exceeds the CCA for the selected channel plus DELTA.

The determining step may be performed by a communication device, and the CCA for the communication channel may exclude communication of the communication device.

The channel sensor may provide an indication of whether a predetermined amount of time has elapsed since a prior change of the selected channel.

The channel evaluator may be adapted to develop a CCA for the non-selected channel, wherein the non-selected channel may be subsequently employed as the selected channel if the CCA for the non-selected channel is less than the CCA for the selected channel plus a preassigned amount DELTA. The channel evaluator also may be adapted to re-perform the evaluation of the non-selected channel if the CCA for the non-selected channel is equal to the CCA for the selected channel plus DELTA.

WiFi devices may include a data rate selector adapted to employ a data rate for transmission of data in a selected channel that yields a packet error rate below a packet error rate threshold. The data rate selector may be adapted to select a modulation scheme and a guard interval for use in the selected channel.

In yet another embodiment, bandwidth selection techniques may be employed using a computer-readable medium having stored thereon a first set of machine-executable instructions adapted to transmit data via a selected channel comprising one of a first channel having a first bandwidth and a second channel having a second bandwidth different than the first bandwidth, the other one of the first and second channels being a non-selected channel; a second set of machine-executable instructions adapted to provide an indication of whether a criterion associated with the communication channel is met; a third set of machine-executable instructions adapted to perform an evaluation of the non-selected channel; and a fourth set of machine-executable instructions adapted to choose one of the selected and non-selected channels to subsequently be employed as the selected channel based on the evaluation, if the criterion associated with the selected channel is met.

In still a further embodiment, a communication device is adapted to communicate selectively via a first channel having a first bandwidth and a second channel having a second bandwidth different than the first bandwidth and includes means for transmitting data via a selected channel comprising one of the first and second channels, the other one of the first and second channels being a non-selected channel; means for sensing the communication channel and providing an indication of whether a criterion associated with the communication channel is met; means for performing an evaluation of the non-selected channel; and means for choosing choose one of the selected and non-selected channels to subsequently be employed as the selected channel based on the evaluation performed by the performing means, if the criterion associated with the selected channel is met. Again, the first and second channels may be wireless channels.

BRIEF DESCRIPTION OF THE DRAWINGS

FIG. 3 depicts an exemplary rate table providing a plurality of data rates that may be used for communication in a system such as that shown in FIG. 1;

FIG. 4 depicts an exemplary table providing a device-specific information element (IE) for Marvell Semiconductor WiFi devices;

DETAILED DESCRIPTION

Figure 1:
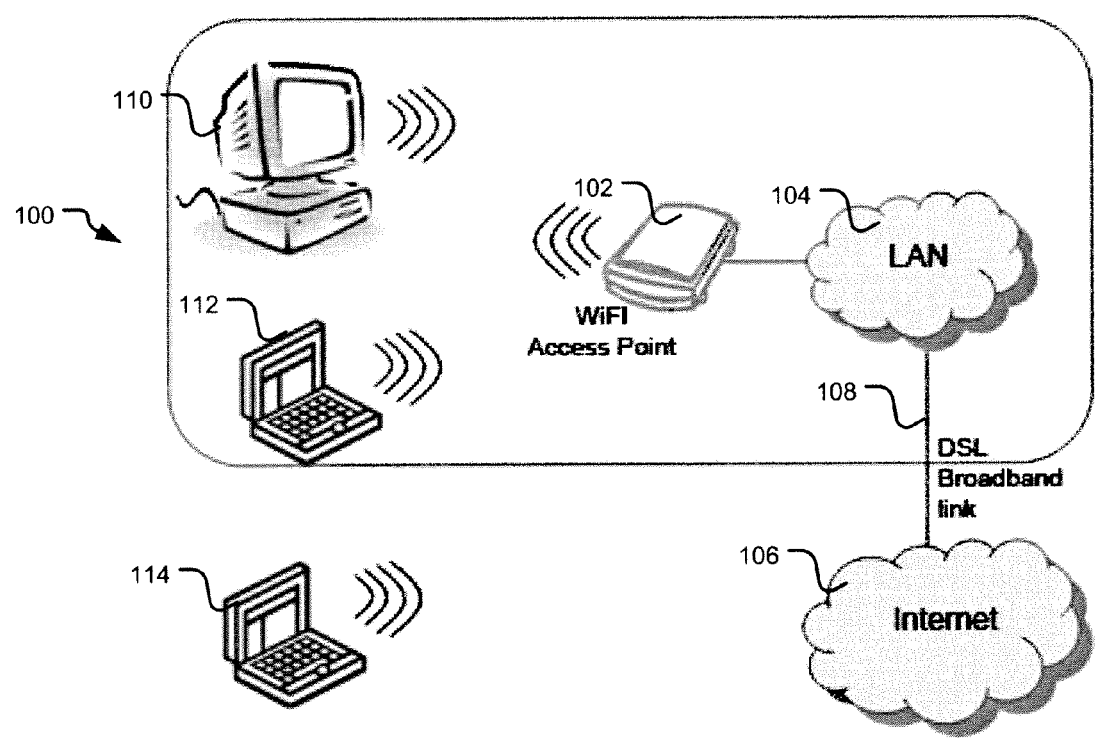
FIG. 1 depicts an exemplary WiFi communication system illustrative of the type of communication system in which bandwidth-switching techniques may be used.

FIG. 1 depicts an exemplary WiFi or other wireless communication system 100 in which bandwidth selection techniques may be employed. The WiFi system 100 includes a WiFi access point 102 which may be coupled to a local area network (LAN) 104, which may, in turn, be coupled to the Internet 106 via a digital subscriber line (DSL) or other broadband link 108. Any desired number of communication stations may be permitted to communicate with one another and/or the LAN 104 or the Internet 106 via the WiFi access point 102. For example, in the illustrated system 100, a desktop computer 110 and laptop computers 112, 114 are shown.

Each of the computers 110, 112, 114 and the WiFi access point 102 may communicate using the IEEE 802.11n communication standard and may be capable of employing the channel bonding option as specified in that standard.

The two adjacent 20 MHz channels of a bonded channel may be identified as a control channel and an extension channel. The control channel may carry the required 802.11 information for protocol mechanisms whereas the data may be transmitted on the entire 40 MHz channel. The switching mechanisms described herein assume that the control channel chosen is correct, and the decision whether to use channel bonding or not may be reduced to whether to use the extension channel or not. As will be understood by those of ordinary skill in the art, changing the control channel is an 802.11 channel change operation and is an involved process requiring a specific exchange of protocol messages between transmit and receive stations. Nevertheless, bandwidth switching techniques as described herein may be employed in conjunction with channel changing operation.

Figure 2:
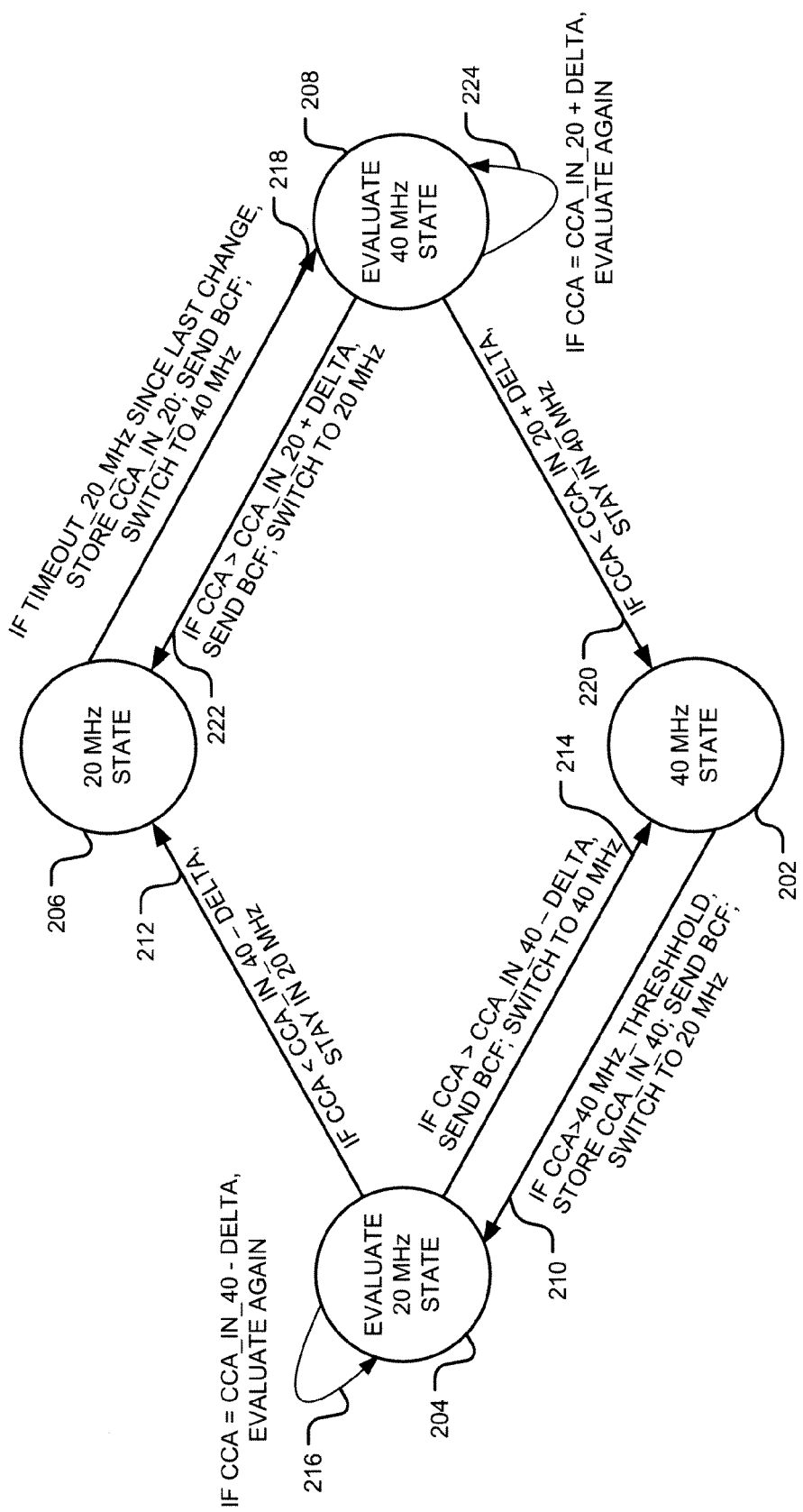
FIG. 2 depicts a state diagram illustrating a technique for selecting between communication channels having two different bandwidths.

FIG. 2 depicts a state diagram 200 illustrating one exemplary bandwidth selection technique for operating a communication station using the channel bonding option available in the current revision of the IEEE 802.11n standard.

Operating in accordance with the illustrated state diagram 200, a WiFi or other wireless communication station may operate in a 40 MHz state 202, an evaluate 20 MHz state 204, a 20 MHz state 206, or an evaluate 40 MHz state 208. Each arrow in the state diagram 200 extends from one state to another state (or to the same state) and represents a transition that the communication station may make between the one state and the other state (or the same state) during operation of the communication station. Each such arrow in the state diagram 200 is annotated with information regarding conditions under which the corresponding transition may occur and actions that may be taken in connection with that transition.

When a communication station is in the 40 MHz state 202 and thus communicating in a 40 MHz communication channel, a clear channel assessment (CCA) of the currently used communication channel (then a 40 MHz channel) is sensed and compared with a CCA threshold value 40 MHz_THRESHOLD (e.g., 50%, 30%, etc.). Of course, a different measure of current usage of the communication channel may be used in lieu of or in tandem with the CCA, if desired.

Each clear channel assessment of a communication channel referred to in this description of the state diagram 200 represents a measure of how busy the communication channel is and may be expressed as a percentage of time that data traffic appears in the communication channel. In some embodiments, the CCA may be determined by a communication station, and the CCA may exclude data traffic in the communication channel that is sent by, or directed to, the communication station, in order to develop a CCA for the communication channel used by the communication station that focuses on data traffic that will interfere with data traffic of the communication station. Generally, the CCA is sensed or accumulated over a period of time, for example CCA_PERIOD=10 ms, or some other suitable time period.

If the CCA for the communication channel exceeds the CCA threshold (i.e., if CCA>40 MHz_THRESHOLD), then the communication station makes a transition 210 from the 40 MHz state 202 to the evaluate 20 MHz state 204, storing the CCA of the 40 MHz channel using a variable CCA_IN_40 and transmitting a bandwidth change frame (BCF) in accordance with the IEEE 802.11n standard, and begins transmitting in a 20 MHz channel. In the evaluate 20 MHz state 204, the CCA of the currently used communication channel (then a 20 MHz channel) is sensed again. If the CCA of the communication channel is less than the previously stored CCA of the 40 MHz channel (CCA_IN_40) minus a preassigned amount DELTA (e.g., 10%, 20%, etc.), then the communication device makes a transition 212 from the evaluate 20 MHz state 204 to 20 MHz state 206, thus continuing to transmit in the 20 MHz channel. On the other hand, if the CCA of the communication channel is greater than CCA_IN_40-DELTA, then the communication station makes a transition 214 from the evaluate 20 MHz state 204 back to the 40 MHz state 202, transmitting a bandwidth change frame and returning to transmission in the 40 MHz channel. In the evaluate 20 MHz state 204, if CCA is found to be equal to CCA_IN_40-DELTA, then the communication station makes a transition 216 to remain in the evaluate 20 MHz state, and the CCA of the communication channel is evaluated again.

In the 20 MHz state 206, a determination is made whether a predetermined amount of time (e.g., TIMEOUT_20_MHz=1 second) has elapsed since the communication channel was last changed (i.e., since the communication station transitioned out of the 40 MHz state 202). If so, then the communication station makes a transition 218 from the 20 MHz state 206 to the evaluate 40 MHz state 208, storing the CCA of the currently used communication channel (then a 20 MHz channel), and sending a bandwidth change frame (BCF), and begins transmitting in 40 MHz.

In the evaluate 40 MHz state 208, the CCA of the currently used communication channel (now a 40 MHz channel) is sensed again. If the CCA of the communication channel is less than the previously stored CCA of the 20 MHz channel (CCA_IN_20) plus DELTA, then the communication device makes a transition 220 from the evaluate 40 MHz state 208 to the 40 MHz state 202, thus continuing to transmit in the 40 MHz channel. On the other hand, if the CCA of the communication channel is greater than CCA_IN_20+DELTA, then the communication station makes a transition 222 from the evaluate 40 MHz state 208 back to the 20 MHz state 206, transmitting a bandwidth change frame and returning to transmission in the 20 MHz channel. In the evaluate 40 MHz state 208, if CCA is found to be equal to CCA_IN_20+DELTA, then the communication station makes a transition 224 to remain in the evaluate 40 MHz state, and the CCA of the communication channel is evaluated again.

The degree to which a communication channel is busy may be measured by a so-called "clear channel assessment" (CCA). The CCA for a channel may be detected by, for example, measuring energy present in the communication channel or sensing a carrier signal within the channel. The CCA may be computed as a percentage of time that the channel is busy during a particular interval of time. In some implementations, the CCA may be adjusted by, for example, excluding data traffic destined for the communication station for which the CCA is being determined. Such an adjustment is appropriate inasmuch as including in the CCA data traffic destined for the communication station would exaggerate the CCA (i.e., the degree to which the channel is busy) when the communication station is receiving a high volume of data. What is of interest is the percentage of time when the communication channel is busy with traffic other than that destined to the communication channel (i.e., when the communication station is neither transmitting nor receiving). The CCA is therefore adjusted by subtracting the time when the channel is occupied with data traffic destined for the communication station. That transmission time of a received packet is calculated by dividing the length of received packet by the rate at which the data packet was transmitted.

Bandwidth switching techniques such as those described herein seek to both improve receiver performance and mitigate interference.

In connection with improving receiver performance, those of ordinary skill in the art will appreciate that the average noise encountered by a receiver is proportional to the bandwidth of the channel used for communication, such that using a 40 MHz channel doubles the average noise encountered by the receiver compared to using a 20 MHz channel. Further, as the maximum output power from a transmitter is generally restricted due to various country-specific requirements (e.g., FCC regulations), employing channel bonding reduces the power transmitted per 20 MHz channel. These factors affect the range performance of a receiver. Accordingly, there is a tradeoff between the amount of data that can be transferred and receiver performance, such that the achievable throughput of a transmitter or receiver is different in different scenarios.

For communication at short range, or where channel conditions are good, preference may be given to bonded 40 MHz channels, while 20 MHz channels may be used at mid-range and long range. In this context, "range" refers to the distance or degree of attenuation between communication stations. Thus, the set of transmission rates may be divided into sets of 40 MHz and 20 MHz transmission rates. A station using one of the 20 MHz transmission rates will use a 20 MHz mode of operation, and a station using one of the 40 MHz transmission rates will use a 40 MHz mode of operation.

FIG. 3 depicts an exemplary rate-table in which the transmission rates may be arranged in decreasing order of raw data throughput. A communication station may endeavor to employ a transmission rate listed in this rate-table that provides highest data throughput under current channel conditions. To avoid frequent bandwidth switching, overlap of 40 MHz rates and 20 MHz rates may be avoided by placing all 40 MHz rates at the top of the table with the 20 MHz rates below them. Bandwidth switching may be employed to achieve a hybrid scheme which switches from 40 MHz to 20 MHz at mid-range to improve performance.

In 802.11n communication systems where switching between 40 MHz and 20 MHz or vice-versa is implicit, thereby avoiding any penalty of data message exchange, deadlocks may be avoided by introducing a new rate where transmitting occurs in 20 MHz and receiving occurs in 40 MHz. This hybrid 20/40 MHz bandwidth mode ensures that even if one station is operating in 20 MHz mode, the other station is able to switch to 40 MHz for receiving while still transmitting in 20 MHz to reduce the likelihood of scenarios where both communication stations are stuck in 20 MHz mode.

Frequent bandwidth switching results in a penalty to data throughput. Specifically, to change from one bandwidth to the other, transmission must be stopped and the radio (transmitter or receiver) must be reconfigured. To reduce this penalty by dampening frequent cycling from 40 MHz to 20 MHz and back to 40 MHz, a time-based throttling lag may be introduced at transitions from 20 MHz to 40 MHz. Specifically, for example, once a station switches from 40 MHz to 20 MHz, it may be configured not to switch back from 20 MHz to 40 MHz for a defined period of time (e.g., a variable bandwidthSwitchtimeout). The variable bandwidthSwitchtimeout may be set to a high enough value to avoid unwanted switching (for example, 1 second). As will be appreciated by those of ordinary skill in the art, the value for bandwidthSwitchtimeout may be adjusted up or down, as appropriate, based on how fast the channel bandwidth can be switched.

Each communication station may encounter interference in the communication channel from adjacent communication stations using the same communication channel. While a communication station is operating in 40 MHz mode, other stations transmitting in both the control and extension channels of the 40 MHz channel may interfere and prevent the communication station from transmitting. As a consequence, the performance of the communication station may be so severely restricted that restricting operation to only the 20 MHz control channel yields better performance.

A communication station that is configured to a operate using channels of a certain bandwidth BW can transmit and receive packets that require spectrum bandwidth of BW or less. To achieve this, the station hardware sets its center frequency to the midpoint of the bandwidth BW and tunes itself to listen to bandwidth BW of spectrum. For interoperability reasons, the 802.11 standard restricts the use of channel bandwidth configurations and defines types of valid transmissions (with corresponding definitions for receivers) to be of either 20 MHz wide or 40 MHz wide. The 20 MHz wide transmissions should occupy control channel bandwidth or be sent in duplicate mode, i.e., using a 40 MHz channel.

Transmit bandwidth may be distinguished from configured bandwidth. Transmit bandwidth refers to spectrum bandwidth of transmissions and may be less than or equal to configured bandwidth, in accordance with IEEE 802.11 rules. To illustrate, a station configured to 40 MHz can transmit on both control and extension 20 MHz channels, as well as a 40 MHz bonded channel, but only 20 MHz control channel transmit and 40 MHz bonded channel transmit are valid. In general, unless specifically pointed out, channel bandwidth of operation refers to the configured bandwidth of a communication station.

Switching transmit bandwidth from 40 MHz to 20 MHz improves transmit performance in terms of power consumption per unit bandwidth but reduces the available spectrum bandwidth by half. The improvement in transmit performance permits higher modulation schemes (i.e., higher data transmission rates) to be used, and hence switching from 40 MHz to 20 MHz does not necessarily reduce the data throughput performance by half. In fact, at long range (i.e., where communication stations are located relatively far from one another), operation in 20 MHz mode may yield better data throughput performance than operation in 40 MHz mode. Thus, the bandwidth switching protocol used by a given communication station may adapt in response to the environment surrounding that communication station.

In scenarios where transmission in 20 MHz is preferable, the receiver can focus only on 20 MHz bandwidth, thereby reducing noise and further improving performance. This can be achieved using either a hardware approach or a software approach. The hardware approach involves the station's RF module rejecting or ignoring transmissions on the extension channel. For example, the extension channel may be ignored in developing a CCA when the station is transmitting 20 MHz (control channel) traffic. Similarly, while receiving packets on the control channel, noise on the extension channel may be ignored in evaluating incoming data traffic. The software approach involves configuring the communication station in 20 MHz mode, which, in turn, involves an exchange of implicit/explicit protocol messages among communication stations.

An exemplary set of transmission rates which may be used in 40 MHz and 20 MHz are shown in FIG. 3. This exemplary set of transmission rates is for use in a rate adapt mode, indoors, and with two communication streams, but the set of transmission rates may be varied if desired for use in other operating modes or with a different number of communication streams.

In operation, a communication station may maintain the current configured bandwidth at any given time in a variable bw_40_mhz channel, so that the bandwidth of operation may be reinstated if bandwidth switching is disabled or the communication station begins to operate on maximum bandwidth, i.e., 40 MHz.

The IEEE 802.11n Draft 2.0 standard specifies that any STA (AP and non-AP) that wishes to change its bandwidth shall issue a Notify_Channel_Width_Action frame. If an AP wishes to receive 20 MHz packets, it broadcasts the management action frame to all STA's. In addition, the AP indicates its current STA Channel Width via the HT Information Element in the beacon. A non-AP STA must inform its associated AP.

A vendor-specific IE may be used to identify peers from that vendor. For example, FIG. 4 shows a table presenting details of a Marvell Semiconductor Identification information element (IE). A Marvell AP will include this IE in all beacons and probe responses that it transmits. A Marvell STA will include this IE in an association request when it is associating with an AP which advertised this IE. A Marvell STA in ad hoc mode will include this IE in all beacons and probe responses that it transmits.

After association, a driver within a communication station may identify a peer as Marvell or Non-Marvell by looking at the Vendor specific IE and then communicate the information in the PEER_CONFIG_INFO data structure using an Update_Station_Database command. The firmware may maintain a bandwidth switching state variable rateadapt_enable_bw_switch that tracks whether operation bandwidth should be modified. Bandwidth switching may be enabled if the communication station is able to implement bandwidth switching (e.g., a communication station implemented by Marvell Semiconductor) and only one peer communication station is connected. Bandwidth switching should be disabled otherwise.

The station may track the last time the bandwidth was switched from 20 MHz to 40 MHz using a variable ht_40_20_last_switch_time. This variable may be reset to zero each time a switch from 20 MHz to 40 MHz occurs and may be updated with every 10 ms tick of a rate adaptation timer. The variable ht_40_20_last_switch_time may be a 16-bit variable that can wrap-around, and a flag variable ht_hacked_disable_40_switch may be used to track whether switching to 40 MHz should be disabled. The flag variable ht_hacked_disable_40_switch may be set to false when last bandwidth switch time exceeds the value of a threshold HT_20_40_SWITCH_HYSTERESIS_TIMEOUT which may be, for example, 1 second. All rate transitions that change operating bandwidth from 20 MHz to 40 MHz may be delayed until the variable ht_hacked_disable_40_switch becomes true.

While a communication station is operating in 40 MHz mode, it will consider transmission by other devices transmitting in both control and extension channels to be interference and will not transmit while those other devices continue transmitting. Of course, this may severely degrade the performance of the communication station to the extent that using only 20 MHz control channel may be preferable.

As described above, bandwidth switching involves reconfiguring the radio. All transmissions should be completed before actual switching is initiated. Once the rate adaptation logic of a communication station determines to switch bandwidth, it will send a message to a Transmit task routine to reconfigure the radio. The Transmit task will stop accepting new packets from the driver and wait until all pending packets are transmitted. When all pending packets have been transmitted and the hardware transmit queues are empty, the Transmit task will invoke a cfg_phy function and configure the radio with new parameters.

A basic profiling of the cfg_phy function was carried out to measure the impact of bandwidth switching with running traffic. The cfg_phy function of SF2 implementation takes approximately 1.025-1.100 milliseconds to configure the radio. Further, while running full-speed AMSDU at 40 Mbps while using 39/54 Mbps PHY rate, the communication station needed approximately 10-14 ms to clear out all pending packets from the hardware queue.

Although descriptions provided herein of bandwidth selection embodiments have referred to the IEEE 802.11n communication standard, as will be apparent to those of ordinary skill in the art, bandwidth selection techniques such as described herein may be employed in any communication system in which devices can switch between communication channels of different bandwidths.

Figure 5A:
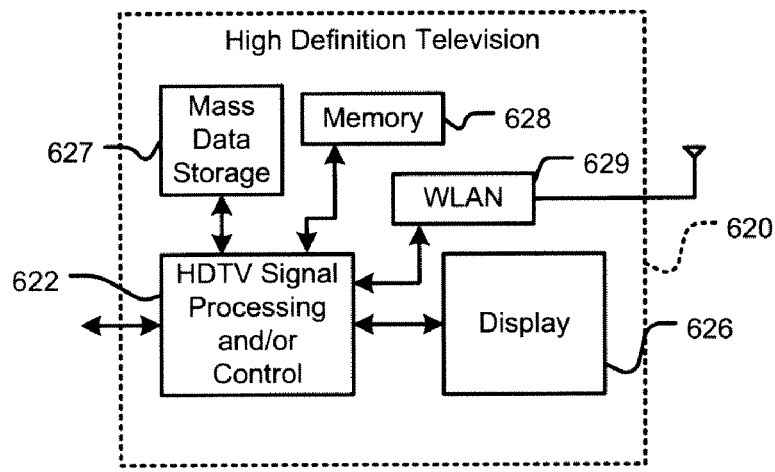
FIG. 5A is a block diagram of a high definition television that may employ bandwidth-switching techniques such as described herein.

Referring now to FIGS. 5A-5F, various example devices that may utilize bandwidth-switching techniques such as described above will be described. Referring to FIG. 5A, such techniques may be utilized in a high definition television (HDTV) 620. The HDTV 620 includes signal processing and/or control circuits, which are generally identified in FIG. 5A at 622, a WLAN interface 629, and a mass data storage 627. Bandwidth-switching techniques may be utilized in the WLAN interface 629 or the signal processing circuit and/or control circuit 622, for example. HDTV 620 receives HDTV input signals in either a wired or wireless format and generates HDTV output signals for a display 626. In some implementations, signal processing circuit and/or control circuit 622 and/or other circuits (not shown) of HDTV 620 may process data, perform coding and/or encryption, perform calculations, format data and/or perform any other type of HDTV processing that may be required.

HDTV 620 may communicate with mass data storage 627 that stores data in a nonvolatile manner such as optical and/or magnetic storage devices. The mass data storage 627 may include one or more hard disk drives (HDDs) and/or one or more digital versatile disks (DVDs). One or more of the HDDs may be a mini HDD that includes one or more platters having a diameter that is smaller than approximately 1.8". HDTV 620 may be connected to memory 628 such as RAM, ROM, low-latency nonvolatile memory such as flash memory and/or other suitable electronic data storage. HDTV 620 also may support connections with a WLAN via the WLAN network interface 629.

Figure 5B:
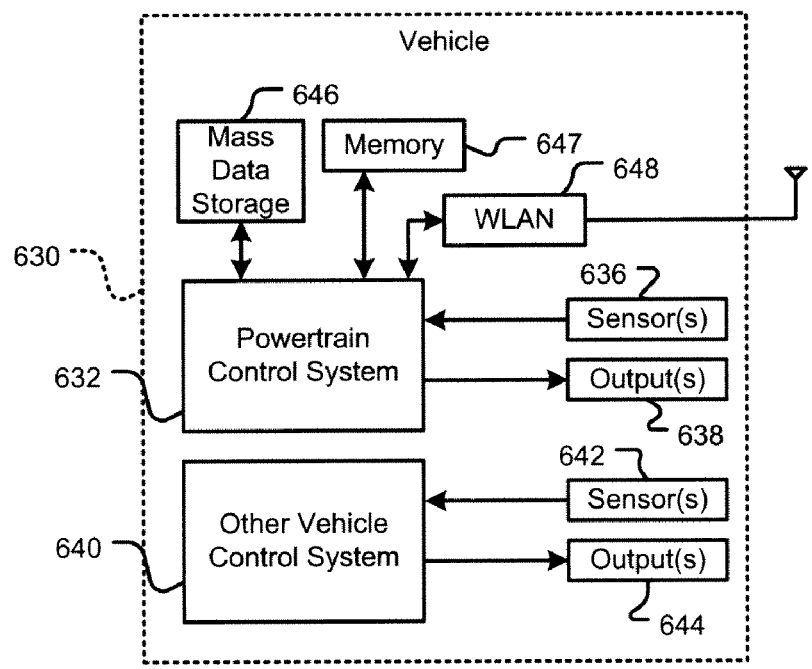
FIG. 5B is a block diagram of a vehicle that may employ bandwidth-switching techniques such as described herein.

Referring now to FIG. 5B, techniques such as described above may be utilized in a control system of a vehicle 630. In some implementations, a powertrain control system 632 receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

A control system 640 may likewise receive signals from input sensors 642 and/or output control signals to one or more output devices 644. In some implementations, control system 640 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 632 may communicate with mass data storage 646 that stores data in a nonvolatile manner. Mass data storage 646 may include optical and/or magnetic storage devices for example hard disk drives HDD and/or DVDs. One or more of the HDDs may be a mini HDD that includes one or more platters having a diameter that is smaller than approximately 1.8". Powertrain control system 632 may be connected to memory 647 such as RAM, ROM, low-latency nonvolatile memory such as flash memory and/or other suitable electronic data storage. Powertrain control system 632 also may support connections with a WLAN via a WLAN network interface 648. Bandwidth-switching techniques such as described above may be implemented in the WLAN interface 648. The control system 640 may also include mass data storage, memory and/or a WLAN interface (all not shown).

Figure 5C:
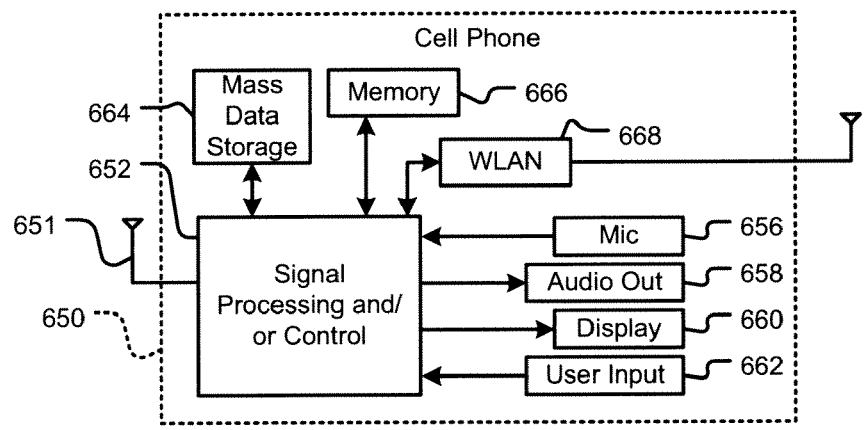
FIG. 5C is a block diagram of a cellular phone that may employ bandwidth-switching techniques such as described herein.

Referring now to FIG. 5C, techniques such as described above may also be utilized in a cellular phone 650 that may include a cellular antenna 651. The cellular phone 650 includes signal processing and/or control circuits, which are generally identified in FIG. 5C at 652, a WLAN interface 668, and a mass data storage 664. Bandwidth-switching techniques may be implemented in the signal processing and/or control circuits 652 and/or the WLAN interface 668, for example. In some implementations, cellular phone 650 includes a microphone 656, an audio output 658 such as a speaker and/or audio output jack, a display 660 and/or an input device 662 such as a keypad, pointing device, voice actuation and/or other input device. Signal processing and/or control circuits 652 and/or other circuits (not shown) in cellular phone 650 may process data, perform coding and/or encryption, perform calculations, format data and/or perform other cellular phone functions.

Cellular phone 650 may communicate with mass data storage 664 that stores data in a nonvolatile manner such as optical and/or magnetic storage devices for example hard disk drives HDD and/or DVDs. At least one HDD may be a mini HDD that includes one or more platters having a diameter that is smaller than approximately 1.8". Cellular phone 650 may be connected to memory 666 such as RAM, ROM, low-latency nonvolatile memory such as flash memory and/or other suitable electronic data storage. Cellular phone 650 also may support connections with a WLAN via a WLAN network interface 668.

Figure 5D:
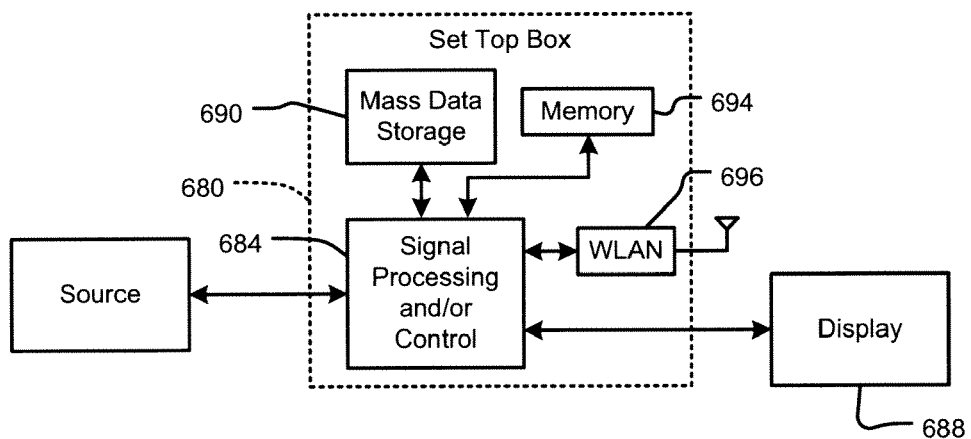
FIG. 5D is a block diagram of a set top box that may employ bandwidth-switching techniques such as described herein.

Referring now to FIG. 5D, techniques such as described above may be utilized in a set top box 680. The set top box 680 includes signal processing and/or control circuits, which are generally identified in FIG. 5D at 684, a WLAN interface 696, and a mass data storage device 690. Bandwidth-switching techniques may be implemented in the signal processing and/or control circuits 684 and/or the WLAN interface 696, for example. Set top box 680 receives signals from a source such as a broadband source and outputs standard and/or high-definition audio/video signals suitable for a display 688 such as a television and/or monitor and/or other video and/or audio output devices. Signal processing and/or control circuits 684 and/or other circuits (not shown) of the set top box 680 may process data, perform coding and/or encryption, perform calculations, format data and/or perform any other set top box function.

Set top box 680 may communicate with mass data storage 690 that stores data in a nonvolatile manner. Mass data storage 690 may include optical and/or magnetic storage devices for example hard disk drives HDD and/or DVDs. At least one HDD may be a mini HDD that includes one or more platters having a diameter that is smaller than approximately 1.8". Set top box 680 may be connected to memory 694 such as RAM, ROM, low-latency nonvolatile memory such as flash memory and/or other suitable electronic data storage. Set top box 680 also may support connections with a WLAN via the WLAN network interface 696.

Figure 5E:
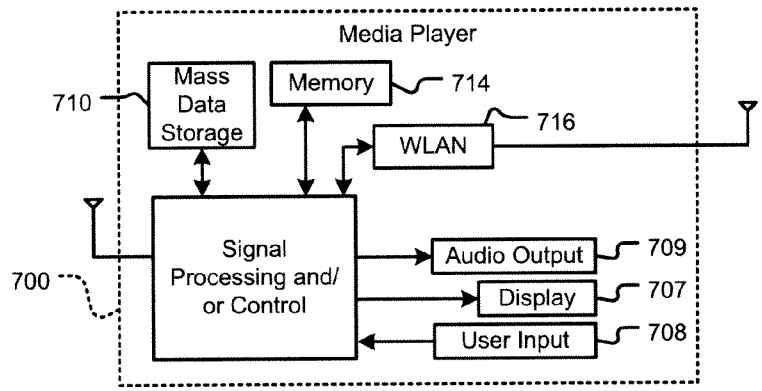
FIG. 5E is a block diagram of a media player that may employ bandwidth-switching techniques such as described herein.

Referring now to FIG. 5E, techniques such as described above may be utilized in a media player 700. The media player 700 may include signal processing and/or control circuits, which are generally identified in FIG. 5E at 704, a WLAN interface 716, and a mass data storage device 710. Bandwidth-switching techniques may be implemented in the signal processing and/or control circuits 704 and/or the WLAN interface 716, for example. In some implementations, media player 700 includes a display 707 and/or a user input 708 such as a keypad, touchpad and the like. In some implementations, media player 700 may employ a graphical user interface (GUI) that typically employs menus, drop down menus, icons and/or a point-and-click interface via display 707 and/or user input 708. Media player 700 further includes an audio output 709 such as a speaker and/or audio output jack. Signal processing and/or control circuits 704 and/or other circuits (not shown) of media player 700 may process data, perform coding and/or encryption, perform calculations, format data and/or perform any other media player function.

Media player 700 may communicate with mass data storage 710 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may be a mini HDD that includes one or more platters having a diameter that is smaller than approximately 1.8". Media player 700 may be connected to memory 714 such as RAM, ROM, low-latency nonvolatile memory such as flash memory and/or other suitable electronic data storage. Media player 700 also may support connections with a WLAN via a WLAN network interface 716. Still other implementations in addition to those described above are contemplated.

Figure 5F:
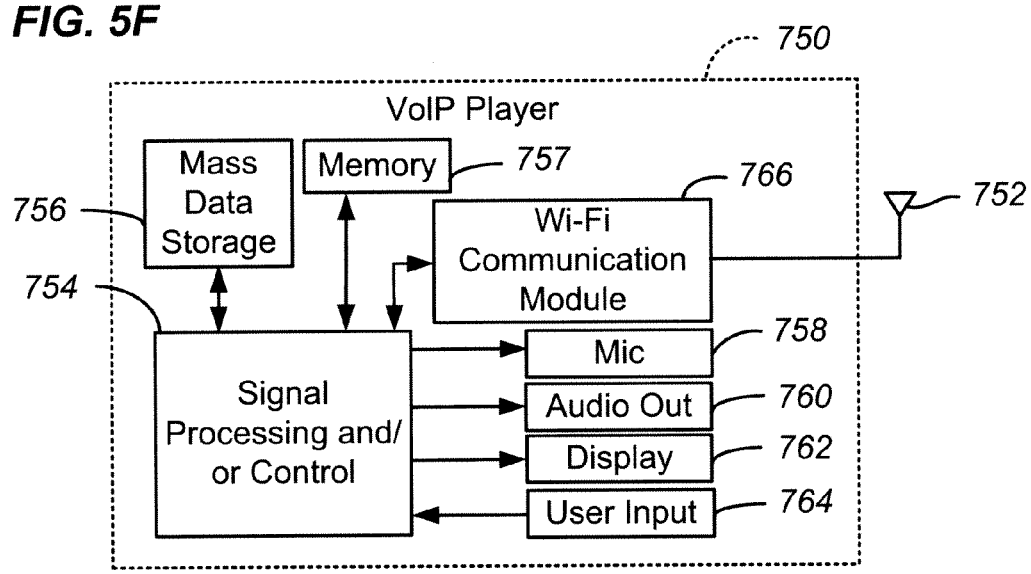
FIG. 5F is a block diagram of a voice-over-IP device that may employ bandwidth-switching techniques such as described herein.

Referring to FIG. 5F, techniques such as described above may be utilized in a Voice over Internet Protocol (VoIP) phone 750 that may include an antenna 754, signal processing and/or control circuits 758, a wireless interface 762, and a mass data storage 766. Bandwidth-switching techniques described above may be implemented in the signal processing and/or control circuits 758 and/or the wireless interface 762, for example. In some implementations, VoIP phone 750 includes, in part, a microphone 770, an audio output 774 such as a speaker and/or audio output jack, a display monitor 778, an input device 782 such as a keypad, pointing device, voice actuation and/or other input devices, and a Wireless Fidelity (Wi-Fi) communication module 762. Signal processing and/or control circuits 758 and/or other circuits (not shown) in VoIP phone 750 may process data, perform coding and/or encryption, perform calculations, format data and/or perform other VoIP phone functions.

VoIP phone 750 may communicate with mass data storage 766 that stores data in a nonvolatile manner such as optical and/or magnetic storage devices, for example hard disk drives HDD and/or DVDs. The HDD may be a mini HDD that includes one or more platters having a diameter that is smaller than approximately 1.8". VoIP phone 750 may be connected to memory 786, which may be a RAM, ROM, low-latency nonvolatile memory such as flash memory and/or other suitable electronic data storage. VoIP phone 750 is configured to establish communications link with a VoIP network (not shown) via Wi-Fi communication module 762.

The various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions, or deletions in addition to those explicitly described above may be made to the disclosed embodiments without departing from the spirit and scope of the invention.

What is claimed is:

1. A method of choosing between a first channel and a second channel for communication between communication devices, wherein the first channel has a first bandwidth and the second channel has a second bandwidth different than the first bandwidth, the method comprising:
   employing the first channel as a communication channel;
   determining whether a criterion associated with the first channel is met while the first channel is employed as the communication channel, including determining whether a predetermined amount of time has elapsed since a prior selection of the communication channel;
   performing an evaluation of the second channel in response to determining that the criterion associated with the first channel is met, wherein performing the evaluation of the second channel comprises obtaining a clear channel assessment (CCA) for the second channel; and
   employing the second channel as the communication channel if CCA for the second channel is less than a CCA for the first channel minus a preassigned amount.

2. The method of claim 1, wherein each of the first channel and the second channel is a wireless channel.

3. The method of claim 1, wherein the criterion associated with the communication channel is whether a measure of data traffic present on the communication channel exceeds a preassigned threshold.

4. The method of claim 1, wherein the first channel has a clear channel assessment (CCA) threshold, and wherein determining whether the criterion associated with the first channel is met comprises determining whether the CCA for the first channel exceeds the CCA threshold for the first channel.

5. The method of claim 1, wherein the first channel is subsequently employed as the communication channel if the CCA for the second channel exceeds the CCA determined for the first channel minus the preassigned amount.

6. The method of claim 1, further comprising repeating the performing of the evaluation of the second channel if the CCA for the second channel is equal to the CCA for the first channel minus the preassigned amount.

7. The method of claim 4, wherein the determination of whether the criterion associated with the first channel is met is performed by a communication device, and wherein the CCA for first channel excludes communication of the communication device.

8. The method of claim 1, wherein the second channel is subsequently employed as the communication channel if the CCA for the second channel is less than the CCA for the first channel plus the preassigned amount.

9. The method of claim 8, wherein the first channel is subsequently employed as the communication channel if the CCA for the second channel exceeds the CCA for the first channel plus the preassigned amount.

10. The method of claim 8, wherein the step of performing an evaluation of the second channel is repeated if the CCA for the second channel is equal to the CCA determined for the first channel plus the preassigned amount.

11. The method of claim 1, wherein one of the first bandwidth and the second bandwidth is twenty megahertz and the other of the first bandwidth and the second bandwidth is forty megahertz.

12. The method of claim 1, further comprising employing a data rate for transmission of data in the communication channel that yields a packet error rate below a packet error rate threshold.

13. The method of claim 12, wherein employing the data rate includes selecting a modulation scheme and a guard interval for use in the communication channel.

14. A communication device configured to communicate selectively via i) a first channel having a first bandwidth and ii) a second channel having a second bandwidth different than the first bandwidth, the communication device comprising:
   a transmitter configured to transmit data via one of the first channel and the second channel,
   a channel sensor configured to
   sense the one of the first and second channels and
   provide an indication of whether a criterion associated with the one of the first and second channels is met;
   a channel evaluator configured to perform an evaluation of the other of the first channel and the second channel in response to receiving an indication that predetermined amount of time has elapsed since a prior change of the channel employed to transmit data, including developing a CCA for the other of the first channel and the second channel; and
   a channel selector configured to select one of the first channel and the second channel to subsequently be employed to transmit data based on the evaluation, if the criterion associated with the one of the first channel and the second channel is met, wherein the other of the first channel and the second channel is subsequently employed to transmit data if the CCA for the other of the first channel and the second channel is less than a CCA for the one of the first channel and the second channel minus a predetermined amount.

15. The communication device of claim 14, wherein each of the first channel and the second channel are wireless channels.

16. The communication device of claim 14, wherein the criterion associated with the one of the first channel and the second channel is whether a measure of data traffic present on the one of the first channel and the second channel exceeds a preassigned threshold.

17. The communication device of claim 16, wherein the channel sensor is configured to provide an indication of whether a clear channel assessment (CCA) for the one of the first channel and the second channel exceeds a predetermined threshold value.

18. The communication device of claim 14, wherein the channel selector is configured to continue to choose the one of the first channel and the second channel if the CCA for the other of the first channel and the second channel exceeds the CCA for the one of the first channel and the second channel minus the predetermined amount.

19. The communication device of claim 14, wherein the channel evaluator is configured to perform a further evaluation of the other of the first channel and the second channel if the CCA for the other of the first channel and the second channel is equal to the CCA for the one of the first channel and the second channel minus the predetermined amount.

20. The communication device of claim 14, wherein the CCA for the one of the first channel and the second channel excludes communication directed to the transmitter.

21. The communication device of claim 14, wherein the other of the first channel and the second channel is subsequently employed as the one of the first channel and the second channel if the CCA for the other of the first channel and the second channel is less than the CCA for the one of the first channel and the second channel plus a preassigned amount.

22. The communication device of claim 21, wherein the channel selector is further configured to continue to employ the one of the first channel and the second channel if the CCA for the other of the first channel and the second channel exceeds the CCA for the one of the first channel and the second channel plus the preassigned amount.

23. The communication device of claim 21, wherein the channel evaluator is configured to re-perform the evaluation of the other of the first channel and the second channel if the CCA for the other of the first channel and the second channel is equal to the CCA for the one of the first channel and the second channel plus the preassigned amount.

24. The communication device of claim 14, wherein one of the first bandwidth and the second bandwidth is twenty megahertz and wherein the other one of the first bandwidth and the second bandwidth is forty megahertz.

25. The communication device of claim 14, further comprising a data rate selector configured to employ a data rate for transmission of data in the one of the first channel and the second channel that yields a packet error rate below a packet error rate threshold.

26. The communication device of claim 25, wherein the data rate selector is configured to select a modulation scheme and a guard interval for use in the one of the first channel and the second channel.

27. A non-transitory computer-readable memory having stored thereon:
a first set of machine-executable instructions to cause transmit data to be transmitted via one of a first channel having a first bandwidth and a second channel having a second bandwidth different than the first bandwidth,
a second set of machine-executable instructions to provide an indication of whether a criterion associated with the one of the first channel and the second channel is met, including determining whether a predetermined amount of time has elapsed since a prior selection of the communication channel;
a third set of machine-executable instructions to perform an evaluation of the other of the first channel and the second channel in response to receiving the indication, wherein performing the evaluation of the other of the first channel and the second channel comprises obtaining a CCA for the other of the first channel and second channel; and
a fourth set of machine-executable instructions to choose between the one of the first channel and the second channel or the other of the first channel and the second channel to subsequently be employed to transmit data based on the evaluation, if the criterion associated with the one of the first channel and the second channel selected channel is met, wherein the other of the first channel and the second channel is subsequently employed to transmit data if the CCA for the other of the first channel and the second channel is less than a CCA for the one of the first channel and the second channel minus a predetermined amount.

28. A communication device configured to communicate selectively via a first channel having a first bandwidth and a second channel having a second bandwidth different than the first bandwidth, the communication device comprising:
means for transmitting data via one of the first channel and the second channel;
means for sensing the one of the first channel and the second channel and providing an indication of whether a criterion associated with the one of the first channel and the second channel is met, including means for determining whether a predetermined amount of time has elapsed since a prior selection of the communication channel;
means for performing an evaluation of the other of the first channel and the second channel in response to receiving the indication, wherein performing the evaluation of the other of the first channel and the second channel comprises obtaining a CCA for the other of the first channel and second channel; and
means for choosing one of the first channel and the second channel to subsequently be employed to transmit data based on the evaluation performed by the performing means, if the criterion associated with the one of the first channel and the second channel is met, wherein the other of the first channel and the second channel is subsequently employed to transmit data if the CCA for the other of the first channel and the second channel is less than a CCA for the one of the first channel and the second channel minus a predetermined amount.

29. The communication device of claim 28, wherein the first channel and the second channel are wireless channels.

* * * * *